Feb. 24, 1925.  1,527,918
L. RINEHART
AUTOMOBILE HEADLIGHT SHADE
Filed April 26, 1924
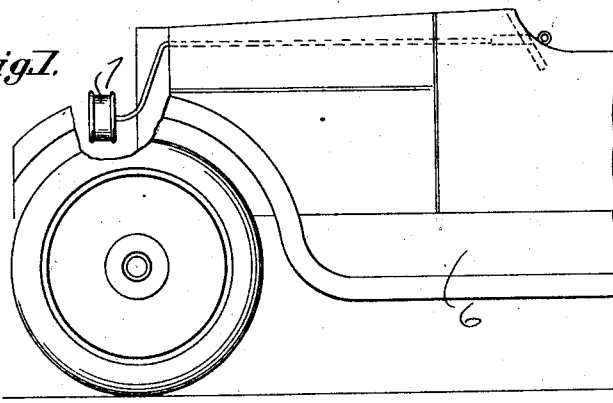
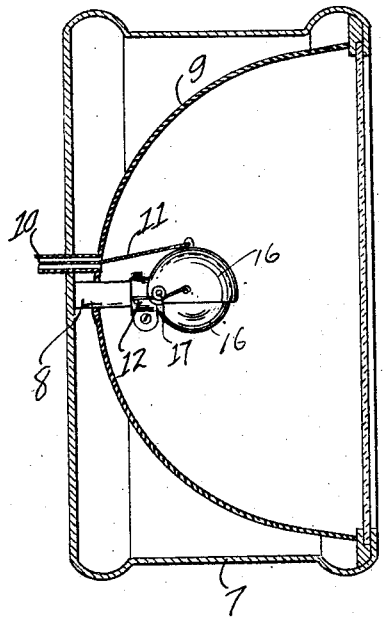
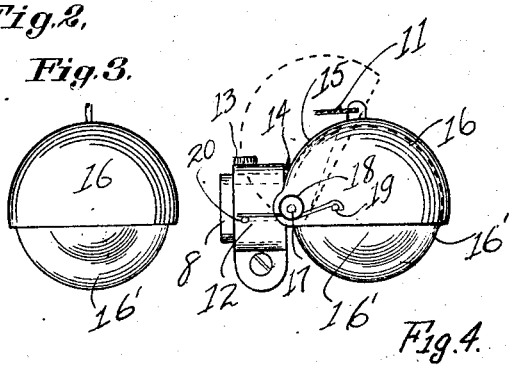
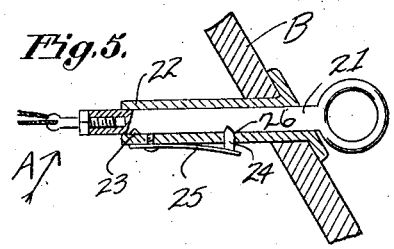
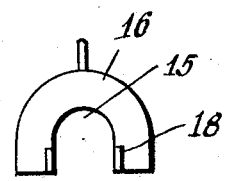
Inventor.
LORON RINEHART
By Victor J Evans
Attorney.

Patented Feb. 24, 1925.

1,527,918

UNITED STATES PATENT OFFICE.

LORON RINEHART, OF WOODBURN, OREGON.

AUTOMOBILE HEADLIGHT SHADE.

Application filed April 26, 1924. Serial No. 709,243.

*To all whom it may concern:*

Be it known that I, LORON RINEHART, a citizen of the United States, residing at Woodburn, in the county of Marion and State of Oregon, have invented new and useful Improvements in Automobile Headlight Shades, of which the following is a specification.

This invention relates to automobile headlights and has particular reference to an anti-glare shade for a head-light.

The principal object of this invention is to provide a simply constructed shade arrangement adapted to be positioned over the bulb of a head-light for protecting in night driving, not only the vision of the driver of the motor vehicle carrying the attachment, but also that of the driver of an approaching car, without detracting from the efficiency of the head-light.

An additional object is to provide an efficient and novel means for operating the shade, which means is so positioned with relation to the operator as to be readily operatable from the driver's seat.

A further object of this invention is to provide a device of the character described which is simple in construction, economical to manufacture, highly efficient in use and a shade which can be readily applied to any type of car without materially altering the construction of the same.

Other objects and advantages will be apparent during the course of the following description.

In the accompanying drawings forming a part of this specification and in which like numerals are employed to designate like parts throughout the same, Figure 1 is a side elevation of the front part of an automobile showing a head-light in position thereon, Figure 2 is a transverse vertical section through a head-light, showing the shade construction in position, Figure 3 is a front elevation of the shade, Figure 4 is a side elevation of the same, and Figure 5 is a detail view of the means for operating the shade.

Figure 6 is a detail view of the shade 16.

In driving an automobile great annoyance has been experienced in operating dimmers and spot-lights for the purpose of reducing the glow of a head-light lamp, due to the fact that the driver is necessarily forced to repeatedly dim the headlight or adjust the spot-light upon the approach of another machine. These spotlights and dimmers are also exceedingly costly and oftentimes cannot be quickly adjusted thus resulting in collisions. To overcome this annoyance and in order to furnish the trade with a simply constructed device which will reduce to a minimum the danger of accidents and in order to provide a shade arrangement for a head-light that will stay in its adjusted position until actuated by the operator, I have devised my present invention in which the numeral 6 designates an automobile provided with the usual head-light 7 and lamp socket 8.

It will be observed that the reflector 9 of the head-light has secured thereto a tubular member 10 which has trained therethrough a cable 11 which will be hereinafter more fully described.

About the socket I propose to place a collar 12 carrying a buffer 13 and having integrally formed therewith an extension 14 which protrudes through a recess portion 15 of a shade 16 and is positioned between the inner periphery of the shade and the exterior of the lamp bulb 16', so as to prevent a rearward glare when the shade is in a shielding position.

It will be observed that the shade is pivotally secured as at 17 to an ear of the collar, and about the pivotal point I propose to position a coil spring 18 having one end thereof fixed to a lug 19 provided on the shade and its opposite end contacting a lug 20 formed on the collar 12.

This referred to spring 18 serves to actuate the shade 16 and retains the same over the bulb of the head-light, when the manually operated means, indicated as a whole by the reference character A, is actuated. The control means consists of a metal key 21 carried in an apertured tubular portion 22 secured to the instrument-board and preferably centrally located thereon.

It will be observed that the key is notched as at 23 so as to receive therein the bevelled or pointed end of a pin 24. This pin is carried by a spring 25 adjacent one end thereof, which spring, in turn is connected at its opposite end to the tubular member 22, with the pin penetrating the aperture 26 of the tubular member so as to be received in the notch 23 when the key is pulled inwardly.

Secured to the end of the key is the cable 11 which is connected to the shade, illustrated in Figure 2, and also to a shade on the opposite side of the car of similar construction, but not herein illustrated.

In the operation of my device manual actuation of the key 21 will cause the pin to be received in the notch of the key and the cable 11 will cause the shade to assume the dotted line position illustrated in Figure 4, the buffer 13 serving to prevent any rattling of the device. On the other hand, when it is desired to shade the head-light it is only necessary to release the pointed pin 24 from the notch and the shade will assume the position shown in Figure 2, and the head-light will be sufficiently shaded so that danger of collision and accident not only to the machine to which the device is attached, but also to an approaching car will be reduced to a minimum, by virtue of the full power of the light being thrown directly in front of the car without casting its blinding rays into the eyes of the driver of the approaching vehicle.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

A device of the character described comprising a collar detachably secured to the socket of a head-light, said collar having formed thereon an upwardly protruding extension, a shade pivotally connected to said collar and having a recess rearwardly formed therein for receiving the extension of the collar, a spring carried by said shade and lugs formed on said shade and collar, substantially as and for the purpose described.

In testimony whereof I affix my signature.

LORON RINEHART.